ated Apr. 20, 1971

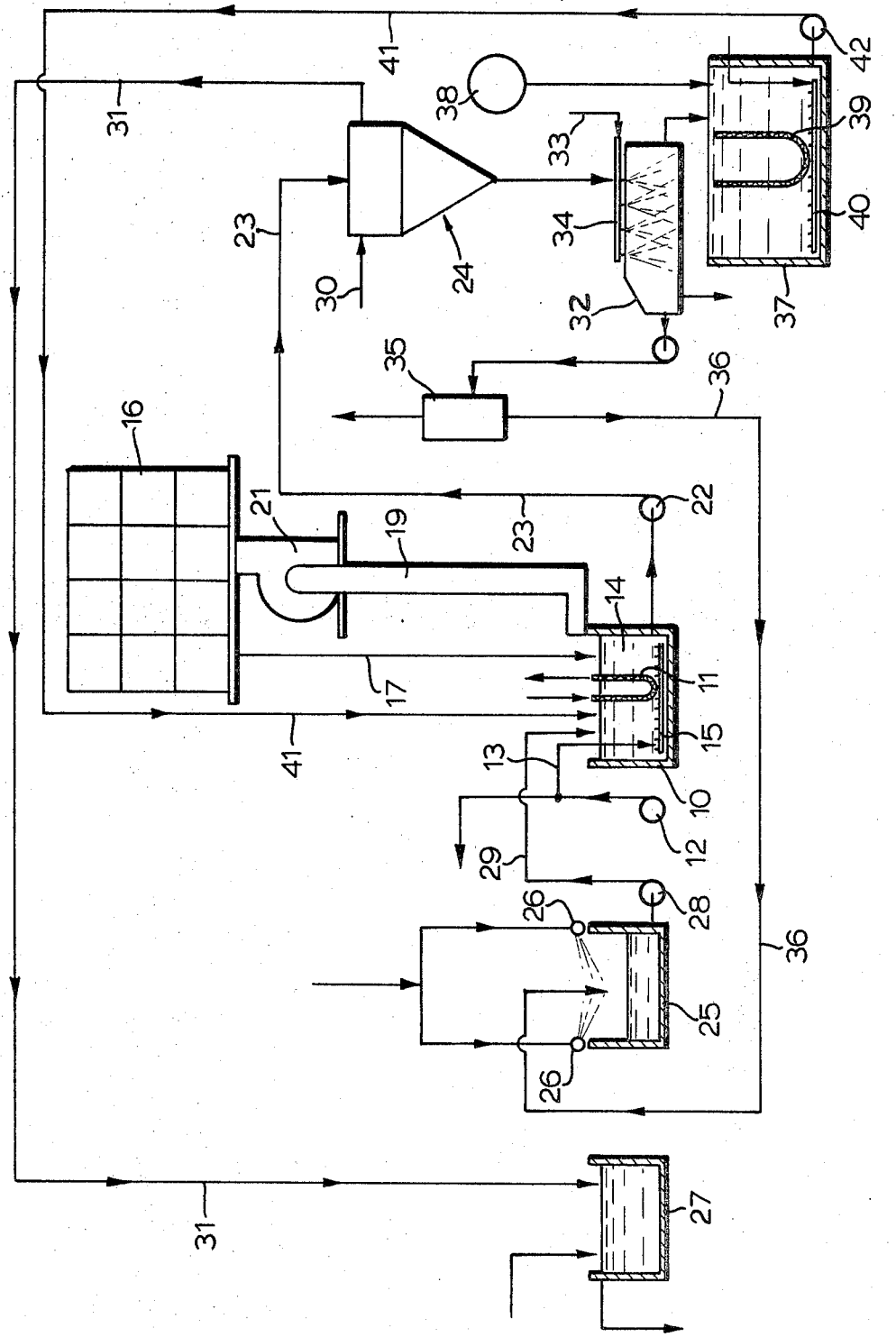

3,575,711
PROCESS FOR PICKLING AND REGENERATING
David Krofchak, 1003 Royal York Road,
Toronto, Ontario, Canada
Continuation-in-part of application Ser. No. 547,556,
May 4, 1966. This application Dec. 26, 1968, Ser.
No. 787,187
Int. Cl. C23g 1/36
U.S. Cl. 134—3        4 Claims

ABSTRACT OF THE DISCLOSURE

A process for pickling iron and steel articles and for regenerating used pickle liquor for re-use in which the articles are pickled in hot aqueous sulphuric acid bath, the bath is actively agitated by air injection to promote efficient heating and maintain uniform conditions throughout the bath. Used solution containing 8% to 12% by weight dissolved iron is removed from the bath and cooled to precipitate dissolved iron as $FeSO_4 \cdot 7H_2O$. Iron-free solution is returned to the bath.

---

This is a continuation-in-part of Ser. No. 547,556, filed on May 4, 1966, now abandoned.

This invention relates to an improved process for pickling ferrous metals and more particularly to an improved process for rapidly and efficiently de-scaling iron and steel products and subsequently removing dissolved iron from the pickle liquor to enable its re-use in pickling operations.

During the hot milling of steel to produce strip, plate, wire and the like finished or semi-finished products, scale and rust usually are formed on the surfaces of the product. It is necessary to remove this scale and rust to give the desired bright finish to final products or to enable subsequent working of semi-finished products. The traditional method of removing rust and scale from such materials involves subjecting the metal to the chemical action of an aqueous sulphuric acid solution, a procedure generally referred to in the art as pickling.

In carrying out these pickling processes, the steel products requiring treatment are immersed in tanks of pickling solution, either on a continuous or batch basis, for a sufficient period of time to effect removal of the rust and scale. After the material is free of rust and scale it is removed from the bath and rinsed to remove adhering acid solution.

During the pickling operation acid is consumed in the formation of soluble iron sulphates and the acid concentration in the pickle liquor decreases as the dissolved iron concentration increases. As more steel is pickled in this manner, the acid strength continuously drops and the time required to pickle the steel increases. Fresh acid can be added to maintain the acid concentration at optimum levels, but eventually the dissolved iron concentration reaches a saturation level and it is necessary to dump the solution from the pickling tank and replace it with fresh solution.

Since the pickling rate is accelerated at elevated temperatures, it is customary to heat the pickling bath and, in most cases, this is done by injecting live steam thereinto. This results in the release of a highly corrosive fog or mist from the pickling bath and also condensation of the large amounts of steam used in the normal course of the pickling operation increases the volume of the pickling solution thereby diluting the acid concentration and causing the pickling tanks to overflow unless provision is made for orderly disposal of excess solution.

Pickling steel in sulphuric acid solution in the above described manner thus produces three separate waste products: (1) spent pickle liquor, including the extra volume resulting from dilution where heating is done by steam injection; (2) rinse water; and (3) acid droplets in the fumes from the heated pickle bath.

The disposal of these waste products presents a very serious problem to the primary and secondary steel industries, particularly with the advent of increasingly stringent anti-pollution laws. Many solutions to the problem have been proposed but none has provided entirely satisfactory results. Neutralization, for example, is an effective way of dealing with acidic waste liquor, but if is a costly procedure, particularly when applied to the spent pickle liquor because of the high capital cost of equipment involved, the cost of neutralizing agent, e.g. lime, and the cost of sludge disposal. In addition, neutralization results in the loss of up to 50% of the original acid provided in the pickling bath. Other methods in which dissolved iron is recovered from the spent pickle liquor by electrolysis with concurrent regeneration of acid appear technically feasible but they have not proven economically practical, particularly for relatively small scale operations. Many other methods involving the recovery of iron from pickle liquor in the form of the monohydrate ($FeSO_4.H_2O$) have been proposed. However, these processes are subject to serious economic and operational difficulties resulting from the high temperature and high acid concentrations which are an inherent part of them.

An important object of this invention is to provide a pickling and pickle liquor regeneration process which is not subject to the foregoing difficulties and which is characterized by chemical simplicity, modest physical size and technological simplicity.

A further object is to provide a process which simultaneously substantially increases pickling rate and facilitates the regeneration of the pickle liquor by enabling efficient, economical removal of dissolved iron. Another object is the provision of a pickling and pickle liquor regeneration process which effectively deals simultaneously with all the basic pollution problems associated with sulphuric acid pickling of steel.

According to the present invention, these and other desirable objects are achieved by a combined pickling and pickle liquor regeneration process which includes conducting the pickling operation in an aqueous sulphuric acid bath in which the acid concentration is controlled within the range of about 8% to about 20% by weight $H_2SO_4$; heating the bath at a temperature within the range of about 140° to about 180° F., actively agitating the bath by injecting air into it to promote efficient heating and mixing of the bath solution so that uniform pickling conditions exist throughout the bath; continuing the pickling operation until the ferrous sulphate concentration in the bath is built up to the equivalent of from about 8% to 12% by weight iron; passing bath solution containing said ferrous sulphate concentration from the pickling tank to an iron removal operation wherein the solution is cooled to below about 140° F. to precipitate dissolved iron as ferrous sulphate heptahydrate; and re-using solution from the iron removal operation in the pickling operation. Preferably, air-borne vapours from the pickling bath are collected and acid recovered therefrom and recycled to the pickling bath. Also, preferably, replacement acid and water are added to the bath as required to maintain optimum pickling conditions in a balanced, closed system.

Although the process is relatively simple, it results in substantial improvement in pickling rate and at the same time overcomes the problems of dealing with noxious waste solutions. The key operation in the process is the air agitation procedure. It has been found that the air agitation of the pickling bath dramatically increases the pickling rate and, at the same time, facilitates control of the pickle liquor volume and composition through evaporation with the result that iron concentration is raised to a level by which it can be readily crystallized from solution as ferrous sulphate heptahydrate by cooling.

The process is described in more detail hereinbelow by reference to the drawing which is a schematic representation of an embodiment of the invention.

In the process illustrated, pickling is carried out on a batch basis in a pickle tank 10. The bath is heated by means of steam heat exchanger 11 to maintain the temperature in the range of 140° to 180° F. and preferably between 158° F. and 160° F., for optimum pickling rate and to prevent crystallization of iron salts in the pickling tank.

An air pump 12 feeds air through line 13 to the pickling bath 14 where it is diffused into the solution through submerged spargers 15 or like apparatus which permits active agitation of the pickling bath by the air bubbles. The air injection and agitation is conducted to promote rapid heat transfer between the pickle bath 14 and heat exchanger 11, thereby enabling use of relatively small size heaters. Also, active air agitation effectively ensures uniform conditions of temperature and solution composition throughout the bath, thereby ensuring maximum pickling rate and productive capacity for any given installation. Vapours from the pickling bath 14 are collected and passed to an acid mist filter 16 where acid is recovered and returned to the bath via line 17. The vapours are collected by elongated duct means 19 positioned at the pickle tank. Compressed air supplied by air pump 12 may conveniently be employed to provide a jet curtain to divert fumes into the duct 19. An exhaust fan 21 is provided in duct 19 to facilitate vapour collection.

The pickling operation is carried out with a solution adjusted to contain about 8% to about 20% by weight sulphuric acid and preferably from about 15% to 20% by weight acid. The acid concentration is maintained within this range by the addition of concentrated acid as required to compensate for acid consumed in the formation of ferrous sulphate.

Pickling is continued with heating and air agitation until the ferrous sulphate concentration in the liquor reaches a level equivalent to about 8% to about 12% by weight dissolved iron. Even though the pickling rate will still be satisfactory within this range, the solution is transferred by pickle liquor pump 22 via conduit 23 to crystallizer 24 for iron removal.

Ferrous articles, after removal of scale and rust in the pickling tank, are transferred to a pickle acid drag-out and rinse tank 25 where adhering acid is rinsed off with clean water sprays supplied through headers 26. The ferrous articles then receive a final fresh water rinse in rinse tank 27. Rinse solution from drag-out tank 25 may be returned to pickle tank 10, via pump 28 and conduit 29 to help replace consumed acid. The air agitation of the pickle bath promotes evaporation of excess water in solution received in the pickle bath from the drag-out rinse tank 25.

In crystallizer 24 the pickle liquor is cooled to the point where dissolved iron crystallizes out in the form of ferrous sulphate heptahydrate ($FeSO_4 \cdot 7H_2O$). With the dissolved iron concentration of the liquor in the range 8% to 12% by weight and acid concentration about 8% to 20% by weight, iron is readily removed when the solution is cooled to below about 140° F., although preferably it is cooled to below about 80° F.

In the embodiment illustrated, cooling is effected by circulating water through cooling coils in the crystallizer. Cool water is introduced through conduit 30, and, after picking up heat from the pickle solution, flows via conduit 31 to the rinse tank 27. Because of its elevated temperature, it is particularly effective for the rinsing operation. From the rinse tank, this water discharges to drain and is neutralized.

When the precipitation of dissolved ferrous sulphate as the heptahydrate from a solution has substantially ceased, the solution and crystals are passed from the crystallizer 24 to vacuum dewatering box 32 where the crystals are separated from the solution and washed with fresh water supplied through conduit 33 and spray header 34. Wash water is passed through separator 35 to drag-out tank 25 via line 36.

The solids free solution is drawn off to a storage tank 37 where fresh acid is added from acid storage tank 38 to bring acid concentration up to the desired strength. A portion of the water removed from the system with the ferrous sulphate heptahydrate crystals can be replaced at this point by addition of process water, although in most cases sufficient make-up water will be introduced into the system through spray headers 26 on the drag-out tank 25.

The solution in tank 37 preferably is maintained at an elevated temperature above about 140° F. by a suitable heating means such as steam heat exchanger 39. Heating efficiency is improved by agitation with air introduced through submerged sparger 40.

Whenever a fresh batch of pickle solution is required, the solution can then be pumped through conduit 41 to pickle tank 10 by acid transfer pump 42 at the temperature required in the pickling bath for efficient pickling. Thus a minimum amount of time is lost in transferring a batch of spent pickle liquor to the crystallizer 24 and replenishing it with fresh hot solution from storage tank 37.

It will be apparent that the process can be conducted on a batch or continuous basis. However, significant economy in equipment and operating costs can be achieved by operating the process on a batch basis, particularly where relatively small installations such as those normally required by secondary steel industries are involved. If the crystallizer and storage tank volumes are selected such that each can conveniently hold at least the same volume of solution as the pickle tanks, the batch operation is particularly efficient. Also the batch method allows the iron crystallization step to be carried out over an extended time and under conditions of agitation and temperature which are conducive to the production of large easily filtered ferrous sulphate heptahydrate crystals.

The process of the invention has many important advantages. Firstly, the air agitation and control of solution temperatures and composition throughout the pickle bath results in a uniformly fast pickling time and thus substantially increases production. In some cases pickling rate has been increased by as much as 100% over that obtainable by conventional procedures with a similar sized pickle bath. A second important advantage resulting from the control of solution composition and volume is that the liquor can be regenerated by a simple, economic procedure wherein the liquor is cooled in a crystallizer by a combination of surface evaporation and fresh rinse water. Recycling of drag-out tank rinse solution and controlled evaporation of any excess solution eliminates the pollution problem involved in the disposal of rinse water and also enables recovery of acid which would otherwise be wasted. The process also eliminates the problem of dealing with corrosive fumes from the heated pickle tanks.

It will be understood that modifications may be made in the improved process of this invention without departing from the scope of the invention defined by the appended claims.

What I claim as new and desire to protect by Letters Patent of the United States is:

1. In the process for the pickling of iron and steel in aqueous sulphuric acid solution the improved method for increasing pickling rate and regenerating used pickle liquor which comprises: conducting the pickling operation in an aqueous bath having an acid concentration within the range of about 8% to about 20% by weight sulphuric acid; heating said bath to a temperature in the range of about 140° F. to about 180° F.; diffusing air into the bath to actively agitate it and maintain substantially uniform conditions of solution temperature and composition throughout the bath; continuing the pickling with active air agitation until the dissolved ferrous sulphate concentration of the solution reaches the equivalent of between about 8% to about 12% by weight dissolved iron; passing pickle liquor containing about 8% to about 12% by weight dissolved iron to an iron removal step in which the liquor is cooled to below 140° F. to precipitate dissolved iron as ferrous sulphate heptahydrate and re-using the solution from the iron removal step in another pickling operation; removing pickled material from the pickling bath and washing said material with water to rinse off adhering acid; passing rinse water to the pickling bath to replace water removed from the system with the ferrous sulphate heptahydrate precipitate and removing excess water cycled to the pickle bath with the rinse water by controlling the degree of air agitation to effect evaporation of the excess water.

2. The process according to claim 1 wherein solution evaporation from the bath is collected and acid recovered therefrom and recycled to the pickling bath.

3. The process according to claim 1 wherein during pickling the acid concentration is maintained within the range of 15–20% by weight and the temperature is maintained in the range of 158°–160° F.

4. The process according to claim 1 in which air is diffused into the bath by injection of compressed air through submerged spargers positioned in the bottom of the pickling bath.

References Cited
UNITED STATES PATENTS

| | | | |
|---|---|---|---|
| 1,225,956 | 5/1917 | Hoffman | 134—13 |
| 1,269,443 | 6/1918 | Hoffman | 134—13 |
| 1,392,781 | 10/1921 | Marsh et al. | 134—13X |
| 1,434,011 | 10/1922 | Hinckley | 134—13 |
| 1,962,295 | 6/1934 | Bruins | 134—13 |
| 2,118,802 | 5/1938 | Barkholt | 134—13 |
| 2,337,062 | 12/1943 | Page | 134—41X |
| 2,428,221 | 9/1947 | Hudson | 134—3 |
| 2,709,143 | 5/1955 | Francis et al. | 134—13 |
| 2,721,562 | 10/1955 | Irvine | 134—13X |
| 2,741,250 | 4/1956 | Rauh | 134—13 |
| 3,310,435 | 3/1967 | Robinson et al. | 134—3 |
| 3,415,748 | 12/1968 | Kovalski | 134—41X |

JOSEPH SCOVRONEK, Primary Examiner

D. G. MILLMAN, Assistant Examiner

U.S. Cl. X.R.

134—13, 41